United States Patent [19]

Mason

[11] Patent Number: 4,799,787

[45] Date of Patent: Jan. 24, 1989

[54] OPTICAL FIBRE RADIATION PYROMETER

[75] Inventor: Ronald A. Mason, Southampton, England

[73] Assignee: Smiths Industries Public Limited Company, London, England

[21] Appl. No.: 125,267

[22] Filed: Nov. 25, 1987

[30] Foreign Application Priority Data

Dec. 10, 1986 [GB] United Kingdom ............... 8629492

[51] Int. Cl.⁴ .................. G01J 5/04; G01J 5/08/5/14
[52] U.S. Cl. ..................................... 356/43; 350/551; 356/44; 374/131
[58] Field of Search ............... 356/43, 44, 45; 250/551; 374/130, 131

[56] References Cited

U.S. PATENT DOCUMENTS

| 3,792,284 | 2/1974 | Kaelin | 250/551 |
| 4,595,839 | 6/1986 | Braun et al. | 250/551 |
| 4,681,434 | 7/1987 | Kepple | 356/45 |

FOREIGN PATENT DOCUMENTS

| 55-83824 | 6/1980 | Japan | 356/43 |
| 1049836 | 11/1966 | United Kingdom . | |
| 1503042 | 1/1978 | United Kingdom . | |

Primary Examiner—Vincent P. McGraw
Attorney, Agent, or Firm—Pollock, VandeSande and Priddy

[57] ABSTRACT

An optical pyrometer for a gas-trubine engine has a radiation receiving head located to view the blades of the engine and supply radiation from the blades to one end of a fibre-optic cable. At the other end of the cable there is mounted a detector comprising a cylindrical metal casing containing a photodiode and a signal conditioning circuit that amplifies the photodiode output. The output circuit is supplied to an electrical connector mounted on the casing. The detector can be mounted directly on the casing of a processing unit by mating its connector with an electrical connector fixed on the processing unit casing thereby avoiding the need for cables between the two casings. The connector on the detector has a flange that provides good thermal contact with the connector on the processing unit so as to help equalize the temperatures of the two casings. The processingunit casing is cooled by means of a thermal transfer unit supplied with liquid fuel. The processing unit has an electrical circuit that processes the output of the detector circuit and inputs from the sources to provide an output to an engine control unit.

8 Claims, 3 Drawing Sheets

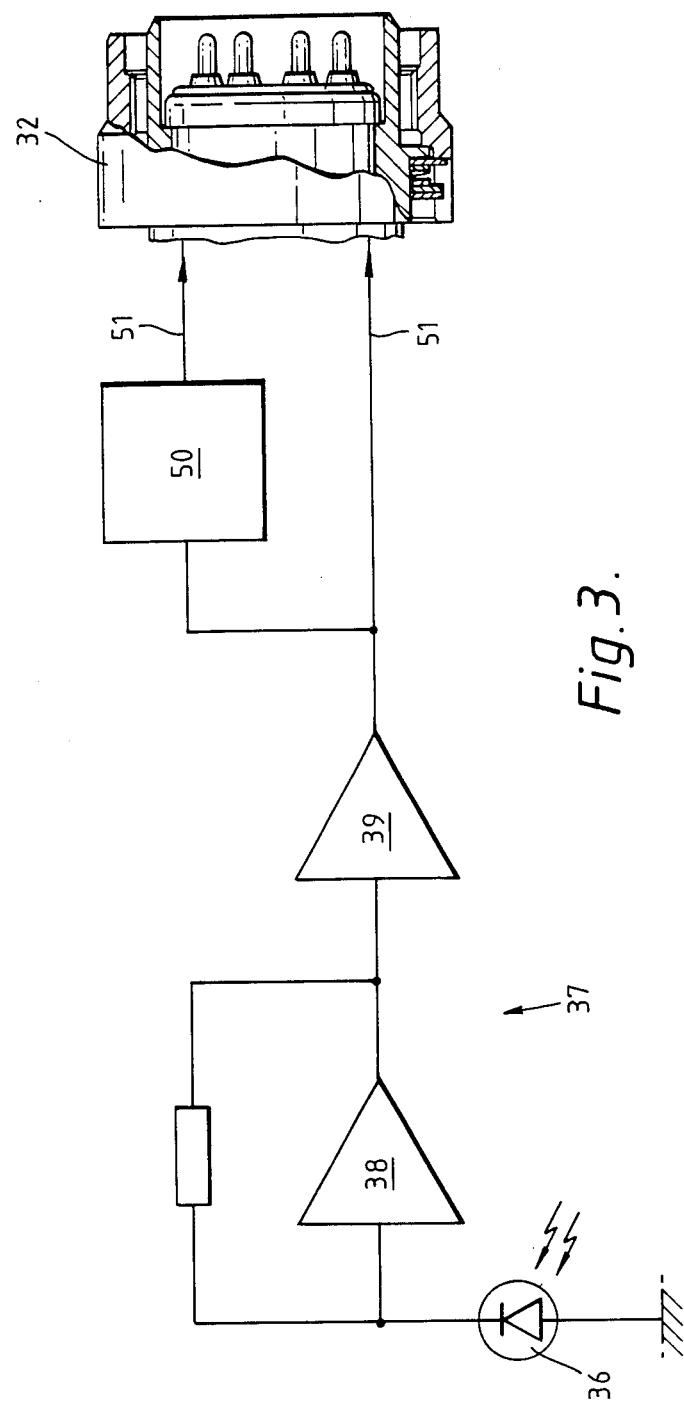

OPTICAL FIBRE RADIATION PYROMETER

BACKGROUND OF THE INVENTION

This invention relates to optical radiation sensor apparatus.

The invention is more especially, but not exclusively, concerned with optical pyrometer apparatus.

Optical pyrometer apparatus are used for measuring high temperatures in for example, gas-turbine engine and furnaces. The pyrometer apparatus includes a radiation receiving head, a radiation detector which produces an electrical output, a preamplifer for amplifying the detector output, and utilizing apparatus for scaling, comparison and calculation on the preamplified output of the detector to provide an output suitable for display of temperature, data storage, performance of a control function and so on.

The radiation detector may be contained in the receiving head so that an electrical output is produced, but there are advantages to mounting the detector remotely and interconnecting the detector and receiving head by a flexible radiation guide, such as a fibre-optic cable. In this way, the detector can be mounted at a cooler location. Such fibre-optic pyrometers, therefore comprise three separate units: the pyrometer head; the detector and preamplifier or other signal conditioning unit; and the utilising apparatus. The pyrometer head is connected to the detector by a fibre-optic cable: the detector is connected to the utilization apparatus by an electrical cable. Other similar optical radiation sensor apparatus are also divided into three units interconnected by cables.

Such apparatus has several disadvantages. The electrical cable and connectors between the detector and utilization apparatus adds to the overall weight of the pyrometer, especially where the cable is screened which is usually necessary in aircraft applications. The cable and connectors can also be susceptible to electromagnetic interference. The detector must also be clamped, screwed or otherwise secured in place, making installation more difficult.

BRIEF SUMMARY OF THE INVENTION

It is an object of the present invention to provide optical radiation sensor apparatus with advantages over previous apparatus.

According to one aspect of the present invention there is provided optical radiation sensor apparatus comprising an optical radiation receiving head arranged to receive radiation; a flexible fiber optic cable having one end coupled with the receiving head, said cable being arranged to transmit radiation from the receiving head; an optical detector assembly including a first rigid casing enclosing an optical radiation detector device and electrical signal conditioning means having an input connected with the detector device and an output connected with a first mateable electrical connector device on said casing; and a processing unit including a second rigid casing containing electrical circuit means having an input connected with a second electrical mateable connector device on the second casing, said circuit means being arranged to process the output of the detector assembly, said second electrical connector device being adapted to mate and engage directly with the first connector device such that the optical detector assembly can be connected with the processing unit without the interposition of any cable between the respective casings.

The detector assembly is preferably retained on the processing unit substantially solely by mating of the first and second electrical connector devices. The first rigid casing may be of substantially cylindrical shape. The first mateable electrical connector device may be secured with the first casing by means of cooperating screw threads on the connector device and casing. The electrical signal conditioning means preferably includes amplifier means arranged to amplify the output of the detector device. The receiving head may include converging lens means arranged to focus radiation onto an end of the optical fibre cable and the detector device may include a photodiode.

The first and second electrical connector devices are preferably arranged to be in good thermal contact with one another when mated such as to promote equalization of the temperatures of the first and second casings. The first connector device may be provided with an annular flange that is arranged to contact a surface on the second connector device so as to provide good thermal contact between the two electrical connector devices. Thermal transfer means may be associated with the second casing and the thermal transfer means may be supplied with a cooling fluid such as liquid fuel. The optical radiation detector device may be thermally insulated from the first casing. The processing unit may be arranged to receive input signals from other sources.

The apparatus may be a pyrometer and the output of the processing unit may be supplied to an engine control unit.

Pyrometer apparatus for a gas-turbine engine in accordance with the present invention will now be described, by way of example, with reference to the accompanying drawings.

BRIEF DESCRIPTION OF THE DRAWINGS

FIG. 3 shows the electronic components of the apparatus schematically.

DETAILED DESCRIPTION

Figure 1:
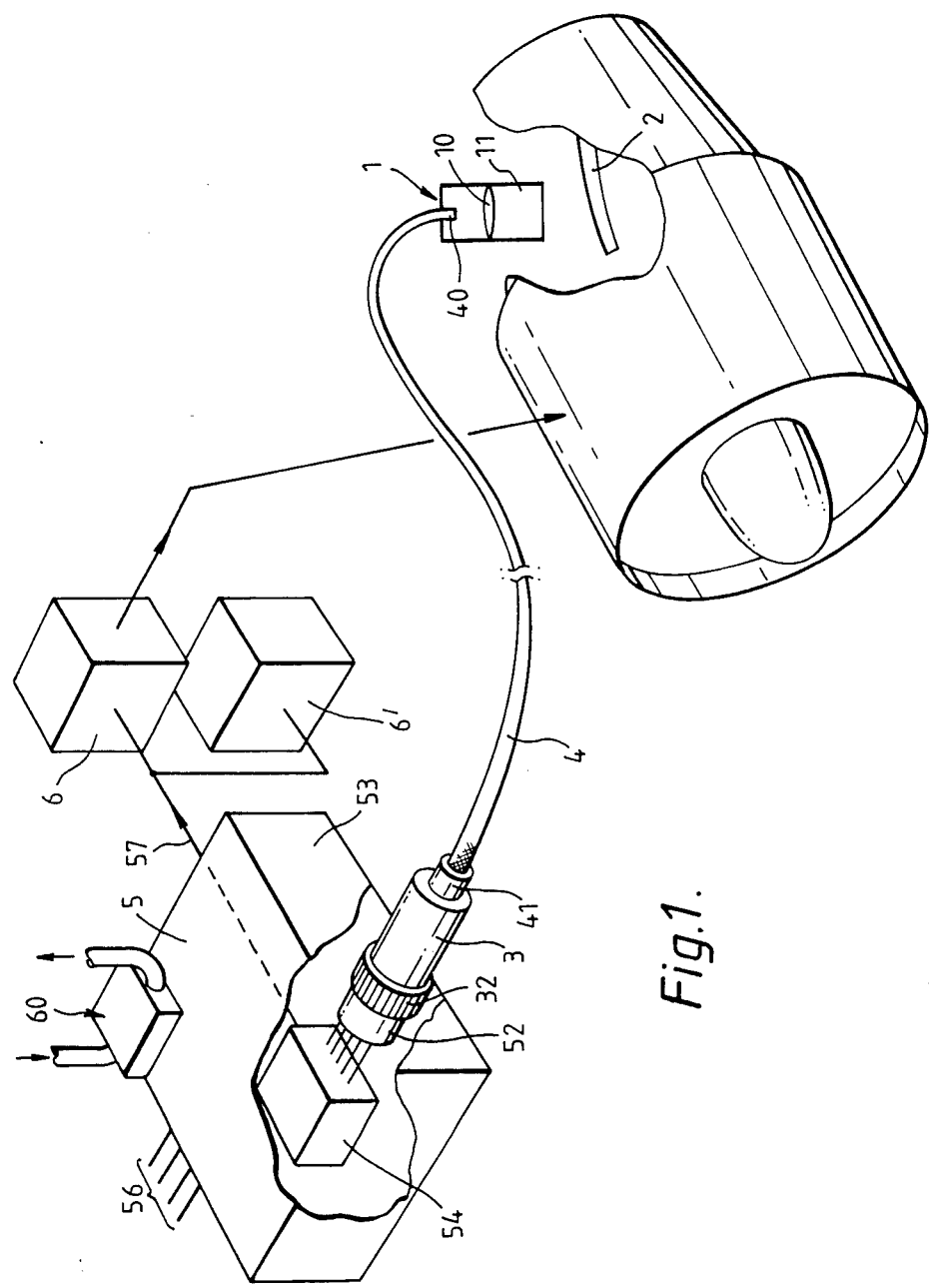
FIG. 1 illustrates the pyrometer apparatus installed on a gas-turbine engine.

With reference first to FIG. 1, the pyrometer apparatus comprises a pyrometer head 1, mounted to view the blades 2 of a gas-turbine engine, a detector 3 connected with the pyrometer head by means of a cable 4, and a processing unit 5 which receives the detector output and provides a signal related to temperature and other parameters to an engine control unit 6.

The pyrometer head 1 is of conventional construction, such as described in GB No. 2158576A or GB No. 1589531, having a heat-resistant converging lens 10 mounted towards the rear of a sighting tube 11. The lens 10 focuses radiation emitted by the blades 2, which enters the sighting tube 11, onto the forward end 40 of the cable 4. The cable 4 is a fibre-optic cable, or some similar optical radiation guide, and is flexible or bendable so that there is freedom in the mounting of the pyrometer head 1 and detector 3. The cable 4 may be armoured for protection and is long enough to enable the detector 3, at the rear end 41 of the cable, to be located at a cooler region.

Figure 2:
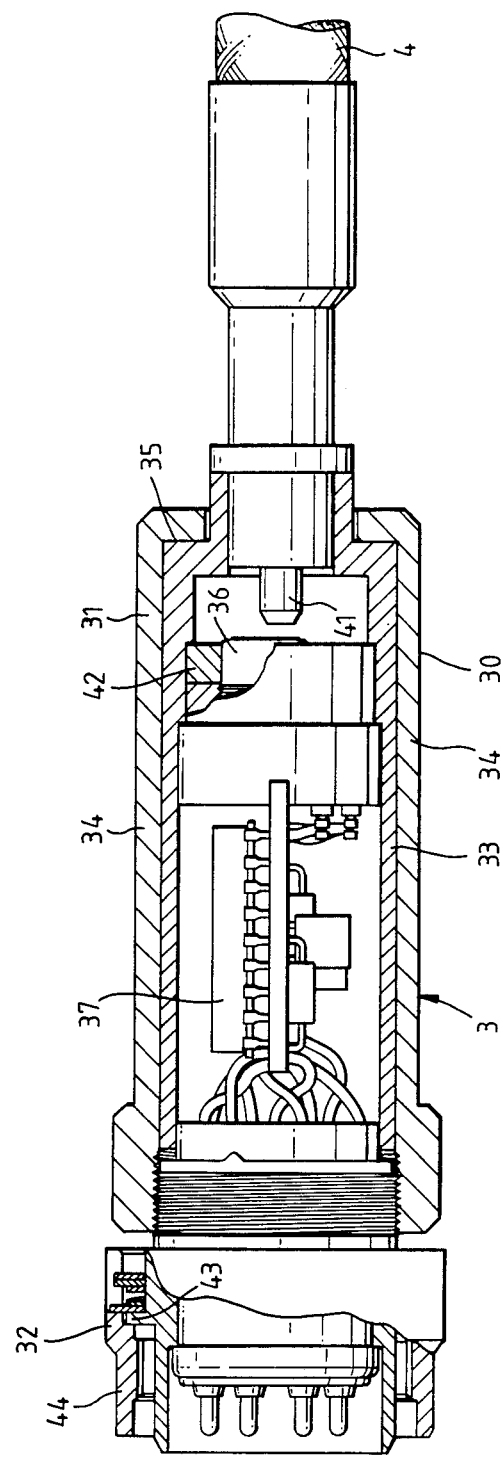
FIG. 2 is a sectional view of a part of the apparatus.

With reference now to FIG. 2, the detector 3 has a cylindrical casing 30 formed by a forward part 31 and rear connector or plug assembly 32. The forward part 31 comprises an inner sleeve 33 welded to the rear end of the cable termination 41, and an outer sleeve 34, the forward end of which engages a shoulder 35 on the inner sleeve and the rear end of which is joined to the plug assembly 32. The overall length of the detector 3 is 60 mm and it has a diameter of 20 mm. Within the forward part 31 of the detector 3 there are mounted one or more photodiodes 36 which receive radiation emitted from the rear end termination 41 of the cable 4. The photodiode 36 is supported in the inner sleeve 33 by a heat insulating support ring 42. A self-regulating heating element (not shown) may be mounted close to the photodiode to enable its temperature to be raised when necessary.

The electrical output of the photodiode 36 is supplied to an electrical circuit assembly 37 within the casing 30 which is shown in greater detail in FIG. 3.

The circuit assembly 37 includes an amplifier 38 which produces a voltage output proportional to the current output of the photodiode 36. This voltage is amplified at a gain stage 39. A circuit 50 may be included for removing signals produced by extraneous flames within the engine. In general, the circuit assembly 37 produces electrical signal conditioning of the output of the photodiode 36 into a form suitable for handling by the processing unit 5. The signals at the output of the circuit assembly 37 are supplied via lines 51 to the plug assembly 32 formed at the rear end of the detector casing 30. The plug assembly 32 is a multi-pin plug-in mateable electrical connector and includes pins by which electrical power is supplied to the circuit assembly 37. The plug assembly 32 has a radially extending flange 43 that is embraced by an outer, threaded locking ring 44.

The plug assembly 32 on the detector 3 is arranged to mate directly with a cooperating electrical connector 52 on the casing 53 of the processing unit 5. The connector 52 has a flat surface (not shown) against which the flange 43 on the connector 32 is abutted in good thermal contact. The processing unit 5 contains electronic processing circuits, indicated generally by the numeral 54. These circuits are connected to the connector 52 so as to receive the signal conditioned output of the photodiode 36 in the detector 3. The processing unit 5 also receives inputs on lines 56 from various other sensors and control devices indicative of, for example, speed, temperature and pressure, and provides an output to the engine control unit 6. The processing unit 5 includes a thermal transfer unit 60 mounted on its casing 53 which is supplied with a fluid, such as liquid fuel, to effect heat transfer, and, more particularly, cooling of the processing unit 5.

One typical method of measuring temperature involves comparing the radiation levels at two different wavelengths. In such an arrangement, the detector would include two photodiodes responsive to the respective two wavelengths. The two outputs produced may either be compared by circuitry in the detector 3 itself, or in the processing unit 5.

The output of the processing unit 5 is supplied by a cable 57 to the engine control unit 6 which provides control of various engine functions. The output of the processing unit 5 may additionally, or alternatively, be supplied to some other form of utilization means 6' such as, for example, a data recorder or a display.

The arrangement of the present invention, by having electrical connector 32 on the casing of the detector 3 that is directly mateable with electrical connector 52 on the casing 53 of the processing unit 5, without the interposition of any cable between the two casings, leads to a very compact arrangement and is less susceptible to electrical noise and other electromagnetic interference. By avoiding the need for a cable between the casings of the detector and processing unit, the overall weight of the apparatus can be kept to a minimum. The detector is directly mounted on the processing unit thereby facilitating installation and maintenance. In this respect, the mating electrical connectors on the detector and processing unit may be locking connectors which are sufficient in themselves to support the detector 3.

Because the mating connectors 32 and 52 are in good thermal contact, via the flange 43, any external heating of the detector 3 can be dissipated efficiently via the casing 53 of the processing unit 5 and the thermal transfer unit 60. This reduces the risk of overheating the photodiode 36 which is further reduced by the heat insulating ring 42. Where the apparatus is used in an environment that is below the optimum temperature of the photodiode 36, the thermal transfer unit 60 can be used to raise the temperature of the detector 3, and the heating element (not shown) used to raise the temperature of the photodiode 36 directly.

In severe temperature environments, the temperature of the detector 3 can be maintained more stable by means of a protective shroud around the detector, separated from the outer sleeve 34 by an air gap. This is especially effective where the detector is located in a stream of flowing gas at extreme temperature.

What I claim is:

1. An optical pyrometer comprising: an optical radiation receiving head; a flexible fibre optic cable having one end coupled with said receiving head such that said cable transmits radiation received by said receiving head; an optical detector assembly fixed with the other end of said cable, said optical detector assembly including a first rigid casing, a first mateable electrical connector device on said casing, an optical radiation detector device and amplifier means within said casing, said amplifier means having an input connected with said optical radiation detector device and an output connected with said first electrical connector device; and a processing unit, said processing unit including a second rigid casing, a second electrical connector device on said second casing, electrical circuit means within said second casing, said circuit means having an input connected with said second electrical connector device, said circuit means being arranged to process the output of the optical detector assembly, and said second electrical connector device being adapted to mate and engage directly with the first electrical connector device such that said optical detector assembly can be connected with said processing unit without the interposition of any cable between the respective first and second casings.

2. An optical pyrometer according to claim 1, wherein said optical detector assembly is retained on said processing unit substantially solely by mating of the first and second electrical connector devices.

3. An optical pyrometer according to claim 1, wherein the said first rigid casing is of substantially cylindrical shape.

4. An optical pyrometer according to claim 1, wherein the said first electrical connector device is shaped to provided good thermal contact with the second connector device when mated so as thereby to promote equalisation of the temperature of the two casings.

5. An optical pyrometer according to claim 4, wherein the said first electrical connector device of the optical detector assembly includes an annular flange that contacts the second electrical connector device of said processing unit so as to provide good thermal contact between said first and second electrical connector devices.

6. An optical pyrometer according to claim 4, wherein a thermal transfer unit is mounted on the casing of said processing unit.

7. An optical pyrometer according to claim 6, wherein the said thermal transfer unit includes means for supplying a cooling liquid to the thermal transfer unit.

8. An optical pyrometer apparatus for viewing the blades of a gas-turbine engine comprising: an optical radiation receiving head; a fibre-optic cable having one end coupled with said optical radiation receiving head such that said cable transmits radiation received by said receiving head from the blades; an optical detector assembly, said optical detector assembly including a first rigid casing, a first mateable electrical connector device on said first casing in good thermal contact with said casing, an optical radiation detector device and amplifier means within said first casing, said amplifier means having an input connected with said optical radiation detector device and an output connected with said first connector device; and a processing unit, said processing unit including a second rigid casing, a second electrical connector device on said second casing, electrical circuit means within said second casing, said circuit means having an input connected with said second electrical connector device, said circuit means being arranged to derive an indication of the temperature of said blades from the output of said amplifier means, said second electrical connector device being adapted to mate and engage directly with the first electrical connector device in good thermal contact with the first electrical connector device such that said optical detector assembly is connected with and retained on said processing unit substantially solely by mating of the first and second electrical connector devices without the interposition of any cables between said first and second rigid casings and such that equalization of the temperatures of the two casings is promoted via said first and second electrical connector devices.

* * * * *